Patented July 10, 1923.

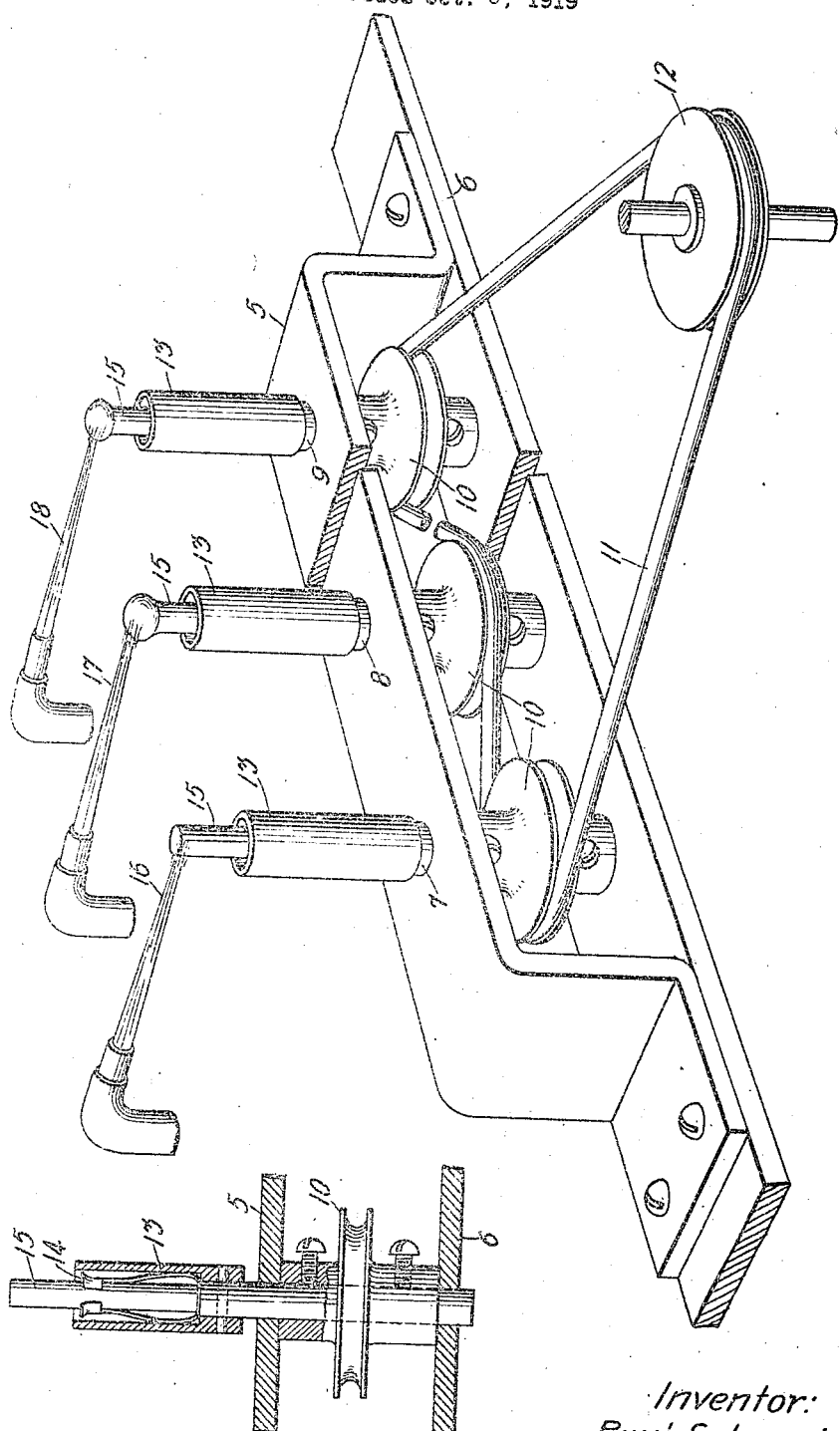

1,461,227

UNITED STATES PATENT OFFICE.

PAUL SCHWERIN, OF NEW YORK, N. Y., ASSIGNOR TO WESTERN ELECTRIC COMPANY, INCORPORATED, OF NEW YORK, N. Y., A CORPORATION OF NEW YORK.

VACUUM-TUBE MANUFACTURE.

Application filed October 6, 1919. Serial No. 328,820.

*To all whom it may concern:*

Be it known that I, PAUL SCHWERIN, a citizen of the United States, residing at New York, in the county of Bronx and State of New York, have invented certain new and useful Improvements in Vacuum-Tube Manufacture, of which the following is a full, clear, concise, and exact description.

This invention relates to vacuum tube manufacture, and more particularly it relates to a machine for rounding the ends of glass arbors used in vacuum tubes.

In the manufacture of vacuum tubes, it is frequently desirable to employ an electrode supporting structure which consists of a glass rod or arbor of suitable length to which the supporting wires for the electrodes may be attached. Heretofore it has been customary to direct by hand a flame on the ends of the arbors to round off their ends before inserting the supporting wires for the electrodes. This invention comprises a machine for accomplishing the same result, whereby a plurality of the arbors may be worked on simultaneously.

The machine of this invention comprises a plurality of rotatable shafts to the ends of which the glass rods may be attached. Flames are provided, for heating the ends of the glass rods in order to round off the ends as desired.

This invention will be better understood by reference to the following detailed description taken in connection with the accompanying drawing in which Fig. 1 represents the machine of this invention, and Fig. 2 is a cross-sectional view of a portion of the same.

Referring to the drawing, members 5 and 6 constitute a frame work for supporting a plurality of rotatable shafts 7, 8 and 9. Each shaft is provided with a pulley 10, connected by a belt 11, to a pulley 12, which is driven by a suitable source of power not shown. Mounted on the end of each shaft is a hollow casing 13 within which suitable spring means 14 are provided for holding the glass rod 15, so that the axis of the glass rod coincides with the axis of the shaft. Flames 16, 17 and 18 are provided for heating the ends of the glass rods, while the glass rods are being rotated. Such an arrangement provides a machine whereby the ends of a plurality of rods may be rounded off simultaneously.

It is obvious that as many rotatable shafts as desired may be mounted on the frame work 5 and 6 and that other modifications may be made in this machine without departing in anywise from the spirit of this invention as defined by the appended claims.

What is claimed is:

1. A machine for rounding off the ends of glass rods comprising a plurality of rotatable shafts, tubular member carried by said shafts, means for attaching a glass rod to an end of each of said shafts whereby the direction of the axis of said rod coincides with the axis of said shaft, said means comprising a leaf spring having a return bend portion, the ends of said spring being adapted to resiliently grip said rod, means for heating the ends of said rods and means for simultaneously rotating said shafts.

2. A machine for shaping the end of a glass rod comprising a rotatable shaft, a tubular member mounted on said shaft coaxial therewith, a spring in said tubular member symmetrically disposed with respect to the axis of said shaft and adapted to resiliently grip a glass rod, and means for heating the end of said rod.

3. A machine for shaping the end of a glass rod comprising a rotatable shaft, a tubular member mounted on said shaft coaxial therewith, a leaf spring having a return bend portion, said spring being arranged in said tubular member with the bow portion thereof frictionally engaging the inner wall of the tubular member, the ends of said spring being adapted to resiliently grip a glass rod and means for heating said rod.

4. A machine for shaping the end of a glass rod comprising a rotatable shaft, a protecting tubular member carried by said shaft and surrounding the major portion of said glass rod for shielding said major portion from the direct application of heat, means for holding said rod in a position to allow only a small portion of said rod to project beyond said tubular member, and means for heating the end of said rod beyond said tubular member.

5. A machine for shaping the end of a glass rod comprising a rotatable shaft, a protecting tubular member carried by said shaft and surrounding the major portion of said glass rod for shielding said major portion from the direct application of heat, means located entirely within said tubular member for holding said rod in a position to allow only a small portion of said rod to project beyond said tubular member, and means for heating the end of said rod beyond said tubular member.

In witness whereof, I hereunto subscribe my name this 30th day of September A. D., 1919.

PAUL SCHWERIN